US012784588B2

(12) United States Patent
Bandi et al.

(10) Patent No.: US 12,784,588 B2
(45) Date of Patent: Nov. 3, 2026

(54) SYSTEMS AND METHODS FOR MANEUVERING AN AUTOMATED VEHICLE

(71) Applicant: Ford Global Technologies, LLC, Dearborn, MI (US)

(72) Inventors: Krishna Bandi, Novi, MI (US); Karthikeya Singirikonda, Farmington Hills, MI (US); Sathyanarayana Chary Palakonda, Northville, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 18/898,150

(22) Filed: Sep. 26, 2024

(65) Prior Publication Data

US 2026/0087930 A1 Mar. 26, 2026

(51) Int. Cl.
*G08G 1/0967* (2006.01)
*H04W 4/44* (2018.01)

(52) U.S. Cl.
CPC ........ *G08G 1/096725* (2013.01); *H04W 4/44* (2018.02)

(58) Field of Classification Search
CPC ......... H04W 4/40; H04W 4/44; H04W 12/06; H04W 12/069; H04W 12/69; H04W 4/021
See application file for complete search history.

(56) References Cited

U.S. PATENT DOCUMENTS

| | | | | |
|---|---|---|---|---|
| 10,151,594 | B1 * | 12/2018 | Chan | G06V 20/597 |
| 10,486,646 | B2 | 11/2019 | Ledvina et al. | |
| 11,373,522 | B2 | 6/2022 | Vanderveen et al. | |
| 11,535,252 | B2 * | 12/2022 | Park | B60W 30/0956 |
| 11,574,541 | B2 * | 2/2023 | Momose | B60K 35/28 |
| 11,767,027 | B2 * | 9/2023 | Roth | B60L 15/2009 701/3 |
| 12,255,877 | B1 * | 3/2025 | Smolsky | H04L 63/0428 |
| 12,555,476 | B2 * | 2/2026 | Monteuuis | G08G 1/096766 |
| 2001/0053699 | A1 | 12/2001 | McCrady et al. | |
| 2007/0106722 | A1 * | 5/2007 | Zeldin | G06F 9/547 709/201 |
| 2020/0047771 | A1 * | 2/2020 | Yoon | B60W 50/08 |
| 2020/0193827 | A1 * | 6/2020 | Refsdal | G08G 1/0133 |
| 2021/0245758 | A1 * | 8/2021 | Ahmad | G08G 1/167 |
| 2021/0364310 | A1 * | 11/2021 | Rolf | G01C 21/3635 |
| 2022/0105954 | A1 * | 4/2022 | Li | H04W 4/08 |
| 2022/0212690 | A1 * | 7/2022 | Zheng | B60K 35/10 |

(Continued)

FOREIGN PATENT DOCUMENTS

| | | | | |
|---|---|---|---|---|
| DE | 102022101479 A1 * | 7/2022 | | G07B 15/063 |
| WO | WO-2018108293 A1 * | 6/2018 | | H04L 9/3263 |

*Primary Examiner* — Redhwan K Mawari
(74) *Attorney, Agent, or Firm* — Burris Law, PLLC

(57) ABSTRACT

A method includes the receipt of one or more vehicle marshaling messages, the initiation of a maneuvering process of a vehicle via a transmission of one or more infrastructure marshaling messages, the receipt of a vehicle-initiated certification key in response to one or more nodes of the vehicle verifying the infrastructure-initiated certification key, the verification that the vehicle-initiated certification key corresponds to an identity of the vehicle, and the generation of a virtual bounding box indicative of a current location of the vehicle.

20 Claims, 9 Drawing Sheets

(56) References Cited

U.S. PATENT DOCUMENTS

| | | | | |
|---|---|---|---|---|
| 2022/0219721 | A1* | 7/2022 | Pfadler | B60W 30/09 |
| 2022/0332350 | A1* | 10/2022 | Jha | H04W 4/023 |
| 2022/0388505 | A1 | 12/2022 | Sharma Banjade et al. | |
| 2023/0100507 | A1* | 3/2023 | Kim | B60W 10/18<br>382/103 |
| 2023/0145508 | A1 | 5/2023 | Kaphengst et al. | |
| 2023/0377460 | A1 | 11/2023 | Sivanesan et al. | |
| 2024/0056297 | A1* | 2/2024 | Ashkinazi | G06F 21/64 |
| 2024/0169830 | A1* | 5/2024 | Fox | G08G 1/096741 |
| 2025/0187634 | A1* | 6/2025 | Bandi | B60W 30/182 |
| 2026/0018052 | A1* | 1/2026 | Henecker | G08G 1/0133 |

* cited by examiner

SYSTEMS AND METHODS FOR MANEUVERING AN AUTOMATED VEHICLE

FIELD

The present disclosure relates to maneuvering a vehicle. More specifically, the present disclosure relates to maneuvering the vehicle in a marshaling setting.

BACKGROUND

The statements in this section merely provide background information related to the present disclosure and may not constitute prior art. Marshaling vehicles rely on camera sensor(s) within a plant marshaling infrastructure for localization of the vehicles from the infrastructure. Recognition of the vehicles at a particular location can be difficult and often inaccurate due to localization issues when using the camera sensor(s). Such difficulties can result in inaccurate onboarding and/or marshaling of the vehicles, which can cause unintentional effects associated with the vehicles, abnormal behavior of the vehicles, delays in production cycle times, mistaken loading/unloading of the wrong vehicles, and/or incorrect vehicle control. Such difficulties can also result in issues with respect to functional capabilities and technical requirements. The present disclosure addresses these and other issues related to the maneuvering of a vehicle.

SUMMARY

This section provides a general summary of the disclosure and is not a comprehensive disclosure of its full scope or all of its features.

The present disclosure provides a method comprising: receiving, in response to a broadcasted maneuvering command, one or more vehicle marshaling messages from a vehicle located within a distance-related threshold from an infrastructure system; initiating a maneuvering process of the vehicle via a transmission of one or more infrastructure marshaling messages, to one or more transmission points, wherein the one or more infrastructure marshaling messages comprise an infrastructure-initiated certification key associated with the vehicle; receiving, from the one or more transmission points, a vehicle-initiated certification key in response to one or more nodes of the vehicle verifying the infrastructure-initiated certification key, wherein the one or more vehicle marshaling messages comprise the vehicle-initiated certification key, and wherein a data rate associated with the vehicle marshaling messages is higher than a data rate interval associated with the infrastructure marshaling messages exchanged with the vehicle during the maneuvering process; verifying that the vehicle-initiated certification key corresponds to an identity of the vehicle; and generating, in response to verifying that the vehicle-initiated certification key corresponds to the identity of the vehicle, a virtual bounding box indicative of a current location of the vehicle; wherein the one or more vehicle marshaling messages are received from the vehicle and includes at least a vehicle identification number associated with the vehicle; wherein the infrastructure-initiated certification key includes a first timestamp, the vehicle identification number, an original equipment manufacturer rolling identifier, or a combination thereof; further comprising: generating a second infrastructure-initiated certification key based on a second timestamp, the vehicle identification number, an original equipment manufacturer rolling identifier, or a combination thereof;

further comprising: transmitting, to the one or more transmission points, a transmission point count message, a transmission point identification message, or a combination thereof; wherein a transmission point, of the one or more transmission points, associated with a location of the vehicle is configured to transmit the infrastructure-initiated certification key to the one or more nodes of the vehicle, and wherein the transmission point is further configured to receive the vehicle-initiated certification key from the one or more nodes of the vehicle; further comprising: causing the vehicle to enter an offboarding state based on successfully identifying the current location of the vehicle within a time-related threshold and using the virtual bounding box or determining that ranging during the maneuvering process is successful; or causing the vehicle to enter the offboarding state or an onboarding state based on one or more communication errors, wherein the one or more communication errors include: unsuccessfully identifying the current location of the vehicle within the time-related threshold; unsuccessfully decoding the verification of the vehicle-initiated certification key; or determining that the ranging during the maneuvering process is unsuccessful; wherein the verification of the vehicle-initiated certification key further comprises: performing a stitching analysis of the vehicle-initiated certification key and the infrastructure-initiated certification key based on a derived secret key approach analysis; and wherein the generation of the virtual bounding box is based on a ranging code pattern generated from a secret key, and wherein the secret key is decoded using the vehicle-initiated certification key and the infrastructure-initiated certification key.

The present disclosure provides another method comprising: receiving, in response to being located within a distance-related threshold from an infrastructure system, a broadcasted maneuvering command at a vehicle; transmitting, based on receipt of the broadcasted maneuvering command, one or more vehicle marshaling messages to the infrastructure system from the vehicle; verifying one or more infrastructure marshaling messages, wherein the one or more infrastructure marshaling messages comprise an infrastructure-initiated certification key received from a transmission point of a plurality of transmission points, wherein the transmission point is associated with a location of the vehicle; and transmitting, in response to verifying the infrastructure-initiated certification key, a vehicle-initiated certification key to the plurality of transmission points, wherein the one or more vehicle marshaling messages comprise the vehicle-initiated certification key, and wherein a data rate associated with the vehicle marshaling messages is higher than a data rate interval associated with the infrastructure marshaling messages exchanged with the vehicle during a maneuvering process, and wherein the transmission of the vehicle-initiated certification key causes a virtual bounding box indicative of a current location of the vehicle to be generated by the infrastructure system; wherein the one or more vehicle marshaling messages include at least a vehicle identification number associated with the vehicle; wherein the vehicle-initiated certification key includes a first timestamp, the vehicle identification number, an original equipment manufacturer rolling identifier, or a combination thereof; further comprising: generating a second vehicle-initiated certification key based on a second timestamp, the vehicle identification number, an original equipment manufacturer rolling identifier, or a combination thereof; further comprising: entering an offboarding state based on the infrastructure system successfully identifying the current location of the vehicle within a time-related threshold and using the virtual bounding box or determining that ranging during the maneuvering process is successful; or entering the offboarding state or an onboarding state based on one or more communication errors, wherein the one or more communication errors include: the infrastructure system unsuccessfully identifying the current location of the vehicle within the time-related threshold; the infrastructure system unsuccessfully decoding the verification of the vehicle-initiated certification key; the infrastructure system determining that the ranging during the maneuvering process is unsuccessful; or the vehicle unsuccessfully decoding the verification of the infrastructure-initiated certification key; further comprising: transmitting, via one or more nodes of the vehicle, to the plurality of transmission points, a vehicular node count message, a vehicular identification message, one or more node identifiers, a ranging rate code bit, a ranging rate sync bit, or a combination thereof; wherein the verification of the infrastructure-initiated certification key further comprises: performing a stitching analysis of the vehicle-initiated certification key and the infrastructure-initiated certification key based on a derived secret key approach analysis; and wherein the generation of the virtual bounding box is based on a ranging code pattern generated from a secret key, and wherein the secret key is decoded using the vehicle-initiated certification key and the infrastructure-initiated certification key.

The present disclosure provides a system comprising: an infrastructure system configured to: receive, in response to a broadcasted maneuvering command, one or more vehicle marshaling messages from a vehicle located within a distance-related threshold from an infrastructure system, initiate a maneuvering process of the vehicle via a transmission of one or more infrastructure marshaling messages to a plurality of transmission points, wherein the one or more infrastructure marshaling messages comprise an infrastructure-initiated certification key associated with the vehicle, receive, from the one or more transmission points, a vehicle-initiated certification key, wherein the one or more vehicle marshaling messages comprise the vehicle-initiated certification key, and wherein a data rate associated with the vehicle marshaling messages is higher than a data rate interval associated with the infrastructure messages exchanged with the vehicle during the maneuvering process, verify that the vehicle-initiated certification key corresponds to an identity of the vehicle, and generate, in response to verifying that the vehicle-initiated certification key corresponds to the identity of the vehicle, a virtual bounding box indicative of a current location of the vehicle; and the vehicle configured to: receive, in response to being located within the distance-related threshold from the infrastructure system, the broadcasted maneuvering command, transmit, based on receipt of the broadcasted maneuvering command, the one or more vehicle marshaling messages to the infrastructure system, verify the infrastructure-initiated certification key received from a transmission point of the plurality of transmission points, wherein the transmission point is associated with the location of the vehicle, and transmit, in response to verifying the infrastructure-initiated certification key, the vehicle-initiated certification key to the plurality of transmission points; wherein the generation of the virtual bounding box is based on a ranging code pattern generated from a secret key, and wherein the secret key is decoded using the vehicle-initiated certification key and the infrastructure-initiated certification key; and wherein the vehicle configured to verify the vehicle-initiated certification key is further configured to: perform a stitching analysis of the vehicle-initiated certification key and the infrastructure-initiated certification key based on a derived secret key approach analysis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
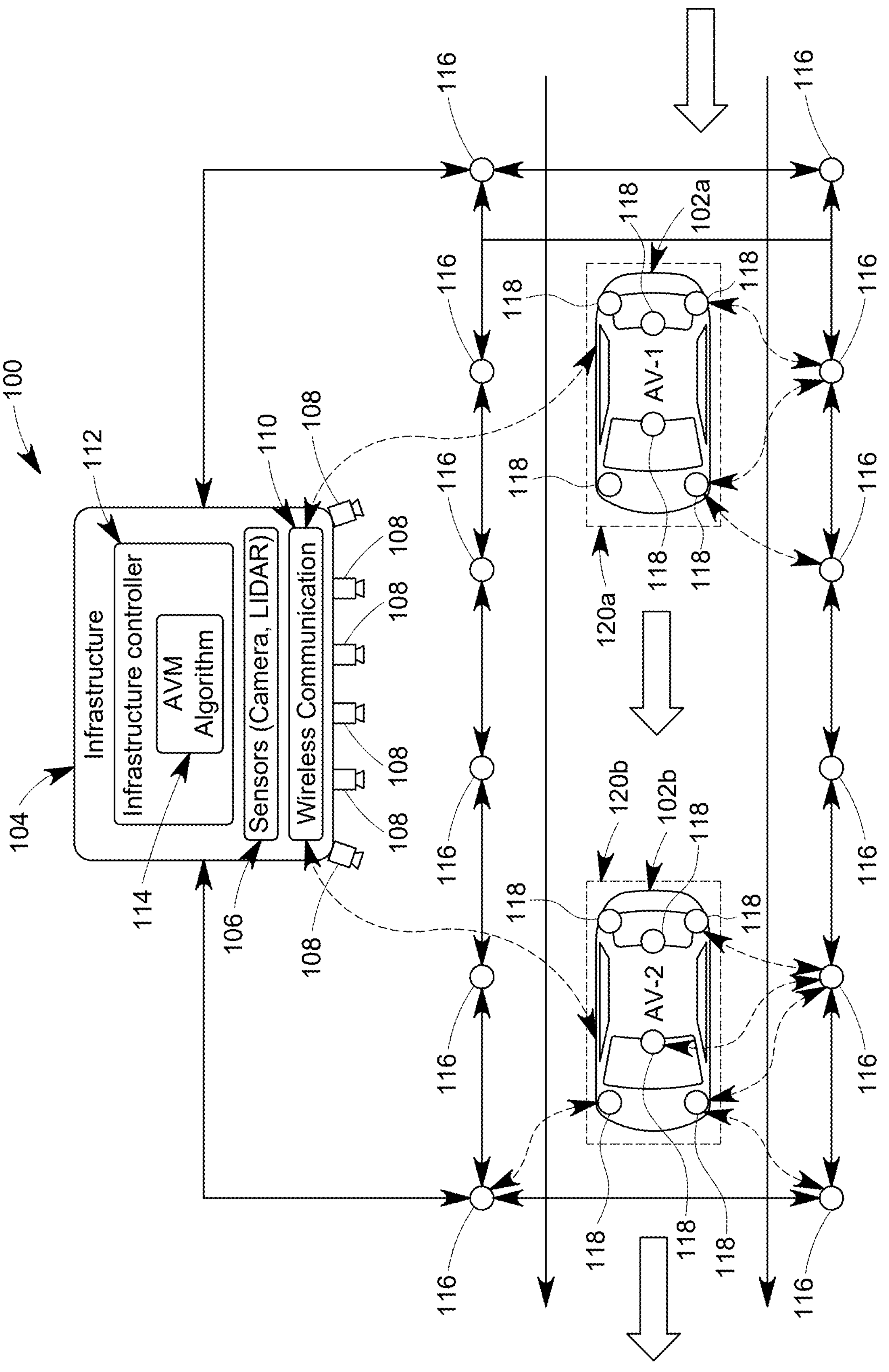
FIG. 1 illustrates a system for automated vehicle marshaling in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for maneuvering a vehicle based on at least one wireless communication protocol that supports the exchange of infrastructure marshaling messages (e.g., IMMs) and vehicle marshaling messages (e.g., VMMs) between an automated vehicle (e.g., an autonomous vehicle) and an infrastructure system. For example, accurate vehicle identification can reduce or eliminate errors in maneuvering a selected vehicle due to correct onboarding into the infrastructure-managed system. As another example, and in a manufacturing use case, efficient manufacturing is provided due to an expedited precise ranging process (e.g., with a few seconds) that offers centimeter-level accuracy having minimized cycle time impacts while vehicles are moving. As yet another example, and in a commercial depot marshaling setting, correct vehicle marshaling is provided that results in correct loading and/or unloading of the vehicles. As a further example, by relying on such a means of maneuvering vehicles, accurate automated parking allocation and/or precise movement of vehicles to charging bays with successful onboarding of the vehicles can be enabled.

Such means of maneuvering vehicles provides advantages over existing solutions, such as ubiquitous identification of the vehicles, wherein vehicle identification anywhere within an operational design domain is enabled, which eliminates a need for markers and/or specific infrastructure. Another advantage of such a means of maneuvering vehicles is that the onboarding process is not dependent on the orientation of the vehicles, which provides flexibility and/or ease of integration. Yet another advantage of such a means of maneuvering vehicles is the global applicability that is designed to work across all markets and regions, which allows for widespread adoption and compatibility. A further advantage of such a means of maneuvering vehicles is guidance for low-speed automation industry standards bodies (e.g., SAE, ETSI, ISO, 5GAA, VDA, etc.) to utilize ranging assistance for successful onboarding of automated vehicles. An additional advantage of such a means of maneuvering vehicles is reducing false identifications during the automated vehicle marshaling process, which enhances overall security and reliability (e.g., enhanced security and/or reliability). Another advantage of such a means of maneuvering vehicles is the use of a combination of IMM and VMMs, along with a unique vehicle identifier and/or ranging protects against man-in-the-middle attacks, which prevents multiple vehicles from marshaling simultaneously. Yet another advantage of such a means of maneuvering vehicles is that vehicles can utilize any combination of one or more nodes during a ranging process for identification and autonomous vehicle marshaling, which provides redundancy and fault tolerance. A further advantage of such a means of maneuvering vehicles is that unintended effects associated with the vehicles is reduced in an instance of performance degradation by the infrastructure or vehicle sensing due to environmental issues.

Referring now to FIG. 1, there is shown a system 100 (e.g., an automated vehicle marshaling (AVM) system) for maneuvering one or more automated and/or semi-automated vehicles 102 (e.g., one or more vehicles 102*a*, 102*b*) within a marshaling environment (e.g., a manufacturing facility or a parking lot). The system 100 includes an infrastructure system 104. The infrastructure system 104 includes a sensor component 106 that communicates with a set of infrastructure sensors 108 such as, for example, one or more cameras, lidar, radar, and/or ultrasonic devices. The set of infrastructure sensors 108 are configured to monitor the movement of the vehicle(s) 102 as the vehicle(s) 102 moves through the marshaling environment. The infrastructure system 104 also includes a wireless communication component 110 that provides for communication between the infrastructure system 104 and the vehicle(s) 102.

Figure 2:
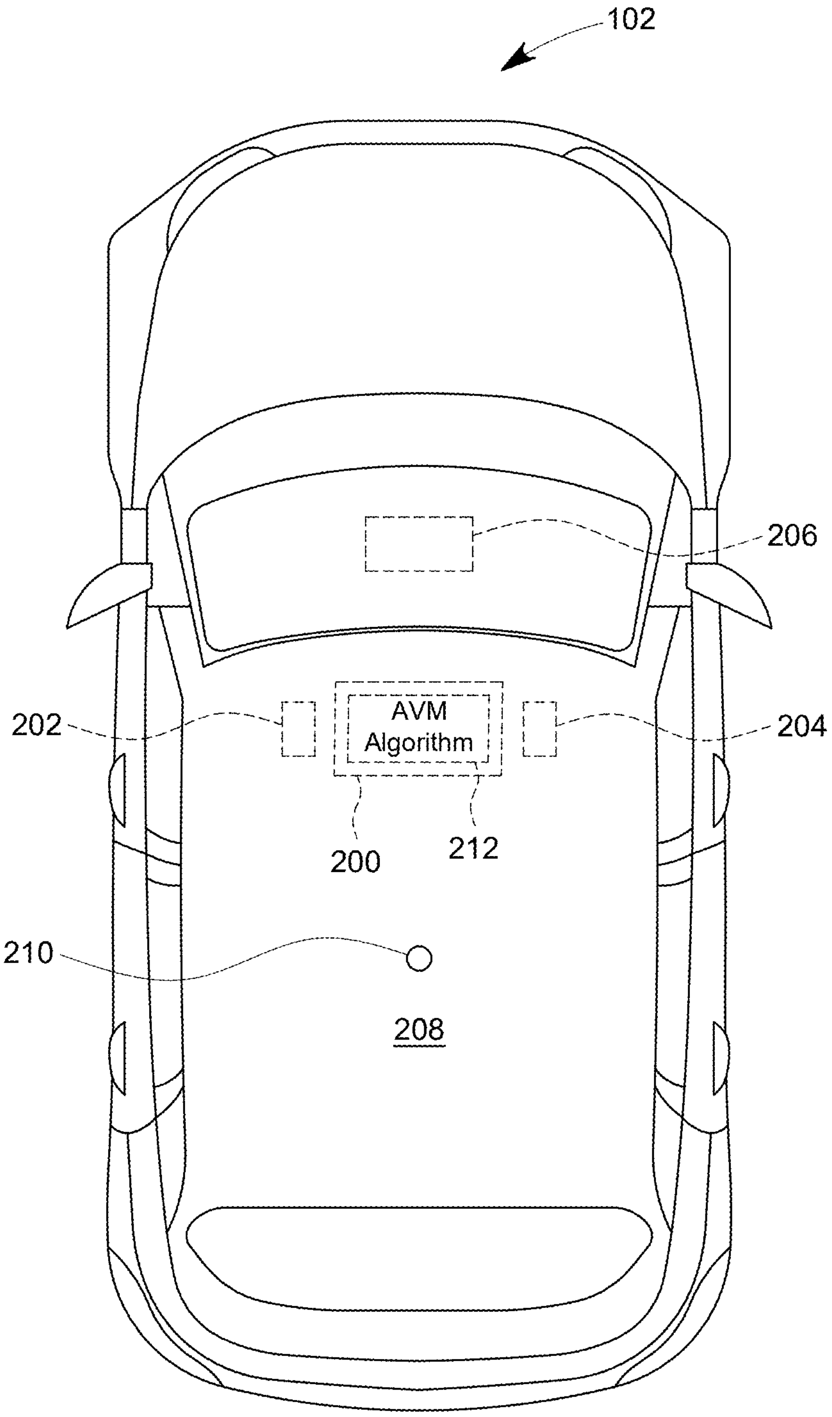
FIG. 2 illustrates an example vehicle marshaled by the system shown in FIG. 1 in accordance with one or more embodiments of the present disclosure.

Additionally, the infrastructure system 104 includes an infrastructure controller 112. The infrastructure controller 112 is configured to centrally control an operation of each of the vehicles 102. For example, the operation of each of the vehicles 102 include propulsion, braking, and/or steering of the vehicle(s) 102. It is understood that the infrastructure controller 112 may be disposed within the infrastructure system 104 or externally located relative to the infrastructure system 104. The infrastructure controller 112 includes an AVM software module 114 (e.g., an infrastructure-side AVM algorithm) that is configured to facilitate communication between the infrastructure controller 112 and a vehicle controller (e.g., a vehicle controller 200 as shown in FIG. 2) associated with each of the vehicles 102. It is understood that the infrastructure-side AVM algorithm 114 is configured to perform one or more machine learning-based analyses in one or more embodiments, such as an input operation 302, a loop-process operation 304, and/or an output operation 308 as is further described in connection with FIG. 3.

The infrastructure-side AVM algorithm 114 is also configured to facilitate communication between the infrastructure controller 112 and one or more anchors 116. For example, each of the one or more anchors 116 can be a transceiver configured to transmit and/or receive any communication-related messages (e.g., instructions, signals, etc.). As an example, the infrastructure controller 112 and the one or more anchors 116 are communicatively coupled by a wired means. As another example, each of the one or more anchors 116 are also communicatively coupled to one another by a wired means. However, it is understood that the one or more anchors 116 may be wirelessly coupled to one another and/or the infrastructure controller 112. For example, the one or more anchors 116 may be positioned throughout the marshaling environment at any distance from one another. As another example, the one or more anchors 116 may be embedded within the floor of the marshaling environment. However, it is understood that the one or more anchors 116 may be disposed atop (e.g., on a surface of and not embedded within) the floor of the marshaling environment as well. It is additionally understood that the one or more anchors 116 may be disposed in a variety of ways such as, but not limited to, some of the one or more anchors 116 embedded within the floor of the marshaling environment and some of the one or more anchors 116 disposed atop the floor of the marshaling environment.

Referring further to FIG. 2, in various forms, the vehicle(s) 102 may be powered in a variety of ways, for example, with an electric motor and/or an internal combustion engine. It is understood that the vehicle(s) 102 may be any type of vehicle powered by an electric motor and/or an internal combustion engine such as a car, a truck, a robot, a plane, and/or a boat. The vehicle(s) 102 generally includes the vehicle controller 200, one or more actuators 202, a plurality of on-board sensors 204, a human machine interface (HMI) 206, and a vehicle system 208. The vehicle(s) 102 also has a reference point 210, that is, a specified point within a space defined by a vehicle body that identifies the location of the vehicle(s) 102. For example, the reference point 210 is a geometrical center point at which respective longitudinal and lateral center axes of the vehicle(s) 102 intersects. As another example, the reference point 210 is a point at which the vehicle(s) 102 is located as the vehicle(s) 102 navigates toward a waypoint.

The vehicle controller 200, in some examples, is configured or programmed to control the operation of one or more of vehicle brakes, propulsion (e.g., control of acceleration in the vehicle(s) 102 by controlling one or more of an internal combustion engine, electric motor, hybrid engine, etc.), steering, climate control, interior and/or exterior lights, etc. The vehicle controller 200, in other examples, is further configured or programmed to determine whether and when the vehicle controller 200, as opposed to a human operator, is to control such operations related to the vehicle(s) 102. It is understood that any of the operations associated with the vehicle(s) 102 may be facilitated via an automated, a semi-automated, or a manual mode. For example, the automated mode may facilitate any of the operations to be fully controlled by the vehicle controller 200 without the aid of the human operator. As another example, the semi-automated mode may facilitate any of the operations to be at least partially controlled by the human operator in combination with the vehicle controller 200. As a further example, the manual mode may facilitate the operations to be fully controlled by the human operator without the aid of the vehicle controller 200.

The vehicle controller 200 includes, or may be communicatively coupled to (e.g., via a vehicle communications bus), one or more processors (not shown). For example, the one or more processors can be a controller, or the like, included in the vehicle(s) 102 for monitoring and/or controlling various vehicle controllers, such as a powertrain controller, a brake controller, a steering controller, etc. The vehicle controller 200 is generally arranged for various communications on a vehicle communication network (not shown) that can include a bus in the vehicle(s) 102 such as a controller area network (CAN), or the like, and/or other wired and/or wireless mechanisms.

Via a vehicle network, the vehicle controller 200 transmits messages to various devices in the vehicle(s) 102 and/or receives messages from the various devices, for example, the one or more actuators 202, the HMI 206, etc. Alternatively, or additionally, in cases where the vehicle controller 200 includes multiple devices, the vehicle communication network is utilized for communications between devices represented as the vehicle controller 200 in this disclosure. Further, as is discussed below, various other controllers and/or sensors provide data to the vehicle controller 200 via the vehicle communication network.

In addition, the vehicle controller 200, via a vehicle-side AVM algorithm 212, is configured for communicating through a vehicle-to-infrastructure communication network, such as communicating with the infrastructure controller 112 and/or the one or more anchors 116. It is understood that the vehicle-side AVM algorithm 212 is configured to perform one or more machine learning-based analyses such as the input operation 302, the loop-process operation 304, and/or the output operation 308 as is further described herein. As an example, any of the input operation 302, the loop-process operation 304, and/or the output operation 308 can use or include one or more machine learning-based techniques with or as part of the vehicle-side AVM algorithm 212. For example, the vehicle-side AVM algorithm 212 can employ a deep neural network (or other artificial neural network) to process data used to perform any of the input operation 302, the loop-process operation 304, and/or the output operation 308.

The vehicle controller 200, via the vehicle-side AVM algorithm 212, is also configured for communicating through a wireless vehicular communication interface with other traffic objects (e.g., vehicles, infrastructures, etc.), such as, via a vehicle-to-vehicle communication network. The vehicular communication network represents one or more mechanisms by which the vehicle controller 200 of the vehicle(s) 102 communicates with other traffic objects. As an example, the vehicular communication network may be one or more of wireless communication mechanisms, including any desired combination of wireless (e.g., cellular, wireless, satellite, microwave, and/or radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The actuators 202 may be used to control braking, acceleration, and/or steering of the vehicle(s) 102. The vehicle controller 200 can be programmed to activate the vehicle actualors 202 including propulsion, steering, and/or braking based on the planned acceleration or deceleration of the vehicle(s) 102.

The plurality of on-board sensors 204 include a variety of devices to provide data to the vehicle controller 200. For example, the plurality of on-board sensors 204 may include object detection sensors (e.g., lidar sensor(s) disposed on or in the vehicle(s) 102 that provide relative locations, sizes, and/or shapes of one or more objects surrounding the vehicle(s) 102, such as additional vehicles, bicycles, robots, drones, etc., travelling next to, ahead, and/or behind the vehicle(s) 102. As another example, one or more of the plurality of on-board sensors 204 can be radar sensor(s) affixed to one or more bumpers of the vehicle(s) 102 that may provide locations of the object(s) relative to the location of each of the vehicles 102.

The plurality of on-board sensors 204 may include a camera sensor, for example, to provide a front view, side view, rear view, etc., providing images from an area surrounding the vehicle(s) 102. As another example, the vehicle controller 200 may be programmed to receive sensor data from a camera sensor(s) and to implement image processing techniques to detect a road, infrastructure elements, etc. The vehicle controller 200 may be further programmed to determine a current vehicle location based on location coordinates (e.g., GPS coordinates) received from the vehicle(s) 102 indicative of a location of the vehicles' 102 location from a GPS sensor (not shown).

The HMI 206 is configured to receive information from the human operator during operation of the vehicle(s) 102. Moreover, the HMI 206 is configured to present information to the human operator, such as, an occupant of the vehicle(s) 102. In some variations, the vehicle controller 200 is programmed to receive destination data (e.g., location coordinates) from the HMI 206.

The vehicle system 208 is configured to control each of the subsystems within the vehicle(s) 102 and facilitate requests across each of the above-described components (e.g., the vehicle controller 200, the one or more actuators 202, the plurality of on-board sensors 204, and/or the HMI 206). Accordingly, the vehicle(s) 102 can be autonomously guided toward a waypoint using at least the plurality of on-board sensors 204. Routing can be performed using vehicle location, distance to travel, queue in line for vehicle marshaling, etc.

Figure 3:
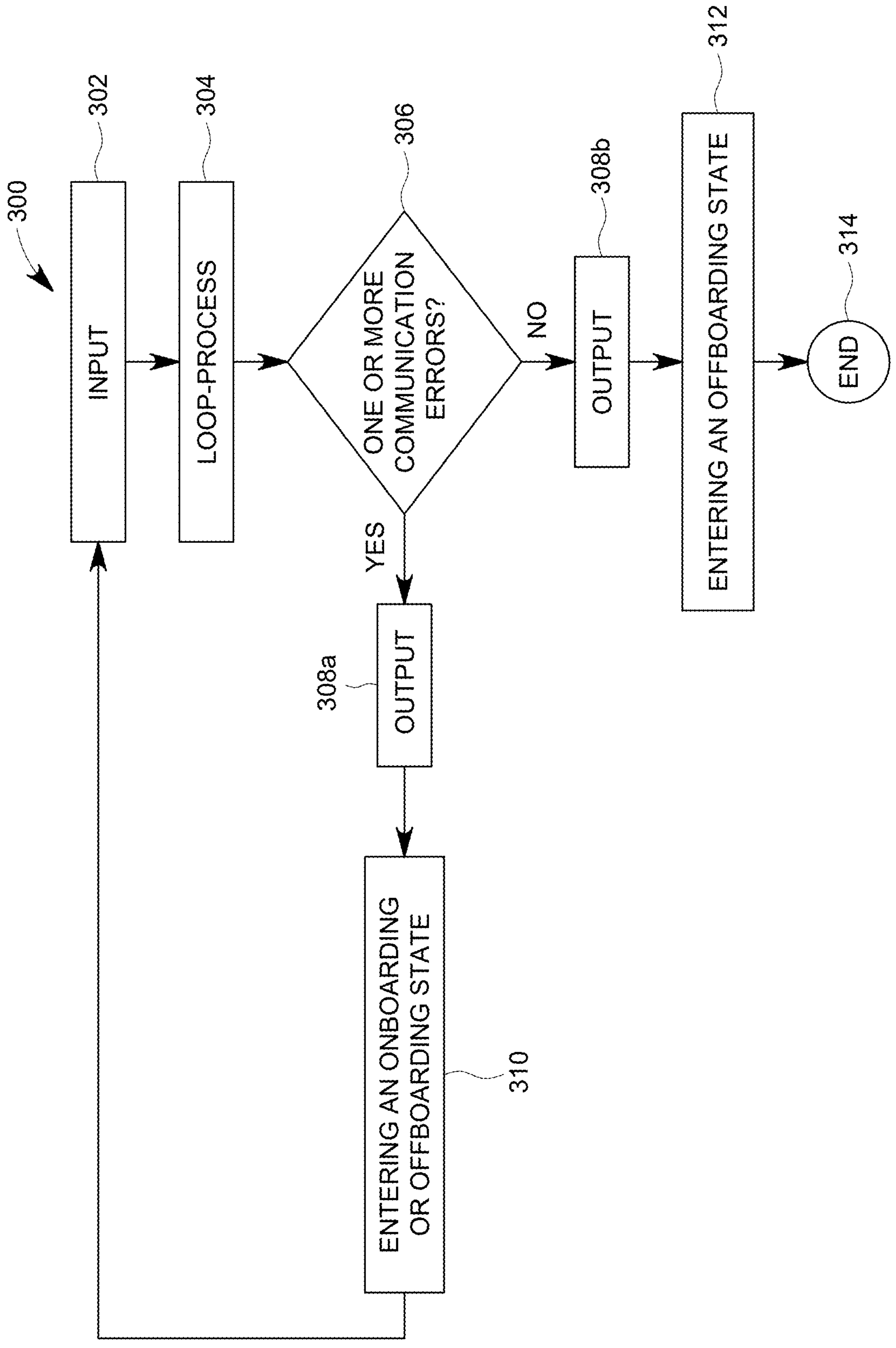
FIG. 3 is a process flow diagram illustrating an example method for onboarding an automated vehicle in accordance with one or more embodiments of the present disclosure.

FIG. 3 depicts a process flow illustrating an example process 300 (e.g., the maneuvering process) for maneuvering an automated vehicle (e.g., the vehicle(s) 102). In one or more embodiments, the process 300 generally includes three primary operations-namely the input operation 302, the loop-process operation 304, and the output operation 308 (the output operation 308 refers to both a first output operation **308*a* and a second output operation 308*b*** in the illustrated example).

At the outset, and from a perspective of the infrastructure system 104, the infrastructure-side AVM algorithm 114 is configured to initiate a vehicle identification process using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). For example, the vehicle identification process can enable the infrastructure-side AVM algorithm 114 to confirm a physical location of the vehicle 102 and establish a ranging to the vehicle 102 that is in communication with the infrastructure-side AVM algorithm 114, via a unicast or broadcast means.

The input operation 302 is initiated by the vehicle-side AVM algorithm 212, wherein the vehicle-side AVM algorithm 212 can cause the vehicle 102 to wirelessly transmit one or more vehicle marshaling messages (VMMs) to the infrastructure system 104. For example, the VMMs can include a vehicle identification number (VIN), a current state-flow identifying command response, a state of the operation mode of the vehicle 102, or a combination thereof. In response to receiving the one or more VMMs, the infrastructure-side AVM algorithm 114 can initiate a wireless transmission of one or more infrastructure marshaling messages (IMMs) to the vehicle 102. For example, the infrastructure-side AVM algorithm 114 can cause the infrastructure system 104 to wirelessly transmit the one or more IMMs to the vehicle 102 based on a system operator's (e.g., a human operator, a mainframe controller, a machine-learning based control system, etc.) confirmation of at least the VIN of the vehicle 102 and/or initiation of maneuvering of the vehicle 102 via the transmission of the IMMs.

The loop-process operation 304 is initiated by the infrastructure-side AVM algorithm 114, wherein the infrastructure-side AVM algorithm 114 can cause the infrastructure system 104 to wirelessly transmit (e.g., via the one or more IMMs) an infrastructure-initiated public security key to each of the one of the one or more anchors 116. For example, the infrastructure-side AVM algorithm 114 can cause the infrastructure system 104 to wirelessly transmit (e.g., via the one or more IMMs) an anchor count and/or an anchor identifier to each of the one of the one or more anchors 116, along with the infrastructure-initiated public security key. However, it is understood that the infrastructure-side AVM algorithm 114 can cause the infrastructure system 104 to wirelessly transmit the anchor count, anchor identifier, and/or the infrastructure-initiated public security key to any number of anchors of the one or more anchors 116 or any specific anchor(s) from the one or more anchors 116. It is also understood that the infrastructure system 104 can transmit the anchor count, anchor identifier, and/or the infrastructure-initiated public security key to the one or more anchors 116 via a wired means.

Once the infrastructure system 104 has started maneuvering the vehicle 102, the system operator can indicate (e.g., identify) at least one anchor(s) of the one or more anchors 116 as being positioned within a range of the vehicle's 102 location at the time the loop-process operation 304 has been initiated. However, it is understood that the system operator can indicate that the at least one anchor(s) of the one or more anchors 116 is positioned within the range of the vehicle's 102 location at any time, and at any time-related frequency, during the marshaling of the vehicle 102. As an example, and based on the system operator's indication of the at least one anchor(s) of the one or more anchors 116 relative to the vehicle's 102 position, the identified anchor(s) of the one or more anchors 116 is configured to wirelessly transmit at least the infrastructure-initiated public security key to one or more nodes 118 (e.g., as shown in FIG. 1) of the vehicle 102. For example, the one or more nodes 118 can correspond to, or represent, the on-board sensors 204. The loop-process operation 304 additionally involves the wireless transmission (e.g., via the one or more IMMs) of a ranging command from the infrastructure system 104 to the one or more anchors 116. For example, the infrastructure-side AVM algorithm 114 can cause the infrastructure system 104 to wirelessly transmit the ranging command to the one or more anchors 116. As another example, the ranging command can include data elements associated with the maneuvering of the vehicle 102 that relate to generate-new-code, prepare-for-ranging, ranging, successful for successful identification of the vehicle 102, or a combination thereof.

The identified anchor(s) of the one or more anchors 116 is further configured to wirelessly transmit the ranging command to the one or more nodes 118 of the vehicle 102. Upon receipt of the infrastructure-initiated public security key and the ranging command, the vehicle-side AVM algorithm 212 can verify the infrastructure-initiated certification key. As a further example, the verification of the infrastructure-initiated certification key can be processed via a hashing method or any other cryptographically-related method. Upon verification of the infrastructure-initiated public security key, the vehicle-side AVM algorithm 212 can cause the one or more nodes 118 to wirelessly transmit (e.g., via the one or more VMMs) a vehicle-initiated public security key to the infrastructure system 104, via the one or more anchors 116. However, it is understood that the one or more nodes 118 can wirelessly transmit the vehicle-initiated public security key directly to the infrastructure system 104. For example, the vehicle-initiated public security key is wirelessly transmitted with a higher data rate than a data rate interval associated with the one or more IMMs.

The vehicle-side AVM algorithm 212 can also cause the vehicle 102 to wirelessly transmit (e.g., via the one or more VMMs) a ranging command response to the infrastructure system 104, via the one or more anchors 116. However, it is understood that the vehicle-side algorithm 212 can cause the vehicle 102 to wirelessly transmit the ranging command response directly to the infrastructure system 104. As an example, the ranging command response for successful identification of the vehicle 102 can include data elements that relate to vehicle-code pattern-identification-inprogress, vehicle-ready, vehicle-ranging-inprogress, vehicle-ranging-completed, vehicle-authorized for successful identification response, or a combination thereof.

In an instance wherein the vehicle 102 is successfully identified, the infrastructure-side AVM algorithm 114 can create a bounding box 120 (e.g., one or more bounding boxes 120*a*, 120*b* as shown in FIG. 1) associated with the vehicle 102. As an example, the bounding box 120 (e.g., a virtual vehicle layout) bounds the vehicle 102 within a matrix grid. As another example, and to the extent that more than one vehicle 102 is being onboarded by the infrastructure system 104, the bounding boxes 120*a*, 120*b* respectively bound each vehicle 102*a*, 102*b*. As a further example, the creation (e.g., generation) of the bounding box(es) 120 is based on a ranging location derived from the message exchange (e.g., the exchange of IMMs and VMMs) between the one or more nodes 118 and the one or more anchors 116 during the maneuvering process 300.

However, in an instance wherein the vehicle 102 is not successfully identified, the ranging command response wirelessly transmitted by the vehicle 102 to the infrastructure system 104 can include data elements that relate to vehicle-codepattern-identification-failed, vehicle-undefined, vehicle-ranging-failed, or a combination thereof. The infrastructure-side AVM algorithm 114 will restart the loop-process operation 304 so that a new ranging command is wirelessly transmitted in the instance wherein the vehicle 102 is not successfully identified. For example, the newly transmitted ranging command may include data particularly pertaining to the generate-new-code. As another example, the unsuccessful identification of the vehicle 102 can be determined if the infrastructure-side AVM algorithm 114 is not successful in recognizing the ranging location of the vehicle 102 within a certain time-period in one or more embodiments. As such, because the vehicle 102 is not recognized within the certain time-period, the vehicle 102 is not properly identified and/or ranged during the maneuvering process 300. As yet another example, the time-period may be any predetermined range and may represent a timeout threshold that may be defined by any time limit. As a further example, the unsuccessful identification of the vehicle 102 can be determined if the infrastructure-side AVM algorithm 114 is not successful in decoding the received vehicle-initialed public security key in one or more embodiments. As an additional example, the unsuccessful decoding of the received vehicle-initiated public security key can render the infrastructure-side AVM algorithm 114 unable to process calculation(s) related to the ranging location of the vehicle at various points in the marshaling and/or maneuvering of the vehicle 102.

As the vehicle 102 travels through (e.g., traverses) the marshaling environment, and as a further aspect of the loop-process operation 304, the vehicle 102 and the infrastructure system 104 cooperate to maintain a communication link so that the vehicle 102 may be maneuvered and/or marshaled through the manufacturing environment. In one or more embodiments, in the instance wherein the vehicle-initiated public security key is wirelessly transmitted, the one or more anchors 116 can be configured to share at least the vehicle-initiated public security key with one another (e.g., each of the one or more anchors 116). For example, receipt of the vehicle-initiated public security key at each of the one or more anchors 116 may provide a precise indication of the location of the vehicle 102, which may aid in the creation of the virtual vehicle bounding box 120 (e.g., via a wireless communication protocol such as UWB).

In one or more additional embodiments, the vehicle-side AVM algorithm 212 can cause the vehicle 102 to wirelessly transmit a dynamic data rate of its respective ranging to the infrastructure system 104 by wirelessly transmitting data elements that pertain to at least nodesCount and nodesIdentifiers, rangingRateCodeBit, rangingRateSyncBit, or a combination thereof. For example, the dynamic data rate wirelessly transmitted by the vehicle 102 can provide a precise ranging identification behavior process. In one or more further embodiments, the vehicle-initiated public security key can be randomly generated by the vehicle-side AVM algorithm 212 using a combination of at least a timestamp, a VIN associated with the vehicle 102, an original equipment manufacturer (e.g., OEM) rolling identifier, or a combination thereof. For example, the vehicle-initiated public security key can be randomly generated at any time-related frequency regardless of whether the vehicle 102 is being actively marshaled by the infrastructure system 104. As another example, the OEM rolling identifier can be negotiated between a backend associated with the infrastructure system 104 and a backend associated with the vehicle 102. As yet another example, the OEM rolling identifier can be negotiated before operation of the vehicle 102 and can be processed using wireless communication protocol(s) supported by the exchange of one or more VMMs.

In one or more further embodiments, the infrastructure-initiated public security key can be randomly generated by the infrastructure-side AVM algorithm 114 using a combination of at least a timestamp, a VIN associated with the vehicle 102, an OEM rolling identifier, or a combination thereof. For example, the infrastructure-initiated public security key can be randomly generated at any time regardless of whether the vehicle 102 is being actively maneuvered and/or marshaled by the infrastructure system 104. As another example, the OEM rolling identifier can be negotiated between a backend associated with the infrastructure system 104 and a backend associated with the vehicle 102. As yet another example, the OEM rolling identifier can be negotiated before operation of the vehicle 102 and can be processed using wireless communication protocol(s) supported by the exchange of one or more IMMs.

The presence of one or more communication errors is determined at operation 306. For example, one or more communication errors can be present in an instance wherein the vehicle 102 is not successfully identified as described herein. At the first output operation **308*a*, the infrastructure-side AVM algorithm 114 can indicate (e.g., to the vehicle 102 via the one or more IMMs) that the maneuvering process 300 is not successfully initiated within an acceptable time range. For example, the indication that the maneuvering process 300 is not successfully initiated can include data elements that pertain to at least stateFlowIdentificationCommand, driveCommandAction, the identity of the vehicle 102 (e.g., the VIN of the vehicle 102) or a combination thereof. As a further example, the data elements associated with the indication that the maneuvering process 300 is not successfully initiated can be associated with or correspond to the vehicle 102 in a case wherein there are more than one vehicle being maneuvered and/or marshaled. The vehicle 102 can be caused to transition to an offboarding state (e.g., a de-boarding state) or an onboarding state (e.g., at operation 310) in response to receiving the data elements associated with the indication that the maneuvering process 300** is not successfully initiated.

As another example, and also at the first output operation **308*a*, the vehicle-side AVM algorithm 212 can indicate (e.g., to the infrastructure system 104 via the one or more VMMs) that the maneuvering process 300 is not successfully initiated and that the vehicle 102 cannot be prepared for automated vehicle marshaling operations. For example, the indication that the maneuvering process 300 is not successfully initiated can include data elements that to at least pertain stateFlowIdentificationCommandResponse, the identity of the vehicle 102, vehicleState's operation mode state, or a combination thereof. As a further example, the data elements associated with the indication that the maneuvering process 300 is not successfully initiated can be respective to the vehicle 102 in a case wherein there is more than one vehicle being maneuvered and/or marshaled. Once the vehicle 102 has entered the onboarding state or the offboarding state at operation 310, the maneuvering process 300 can revert to the input operation 302 and the maneuvering process 300** can restart.

However, in a case wherein one or more communication errors are not present (e.g., as is determined at operation 306), as is described herein, the second output operation **308*b* is initiated. At the second output operation 308*b*, the infrastructure-side AVM algorithm 114 can indicate (e.g., to the vehicle 102 via the one or more IMMs) that the maneuvering process 300 is successfully initiated. For example, the indication that the maneuvering process 300 is successfully initiated can include data elements that pertain to at least stateFlowIdentificationCommand, the identity of the vehicle 102, driveCommandAction, or a combination thereof. As a further example, the data elements associated with the indication that the maneuvering process 300** is successfully initiated can be associated with or correspond to the vehicle 102 in a case wherein there is more than one vehicle being maneuvered and/or marshaled.

As another example, and also at the second output operation 308*b*, the vehicle-side AVM algorithm 212 can indicate (e.g., to the infrastructure system 104 via the one or more VMMs) that the maneuvering process 300 is successfully initiated. For example, the indication that the maneuvering process 300 is successfully initiated can include data elements that pertain to at least stateFlowIdentificationCommandResponse, the identity of the vehicle, vehicleState's operation mode state, or a combination thereof. As a further example, the data elements associated with the indication that the maneuvering process 300 is successfully initiated can be associated with or correspond to the vehicle 102 in a case wherein there are more than one vehicle being maneuvered and/or marshaled. Once the indication of the successful initiation if the maneuvering process 300 is transmitted/received, the vehicle 102 can enter the offboarding state at operation 312, at which point the maneuvering process 300 is complete at operation 314.

In one or more embodiments, both the infrastructure-side AVM algorithm 114 and the vehicle-side AVM algorithm 212 are configured to perform a stitching analysis of the vehicle-initiated public security key and the infrastructure-initiated public security key using a derived secret key approach analysis. In one or more additional embodiments, the vehicle-side AVM algorithm 212 can cause the vehicle 102 to exchange the re-calculated public security key (e.g., the stitched version of the vehicle-initiated public security key and the infrastructure-initiated public security key), the derived secret key, and/or a unique vehicle identifier to the one or more anchors 116 (e.g., via the one or more nodes 118). For example, the exchange of the re-calculated public security key, the derived secret key, and/or a unique vehicle identifier to the one or more anchors 116 can be transmitted/received by using data elements pertaining to anchorsCount, nodesCount, or a combination thereof. In one or more further embodiments, a ranging code pattern is generated from a SharedvIDSecretKey data element that is decoded using the vehicle-initiated public security key and the infrastructure-initiated public security key and exchanged via the one or more IMMs and/or the one or more VMMs.

Figure 4A:
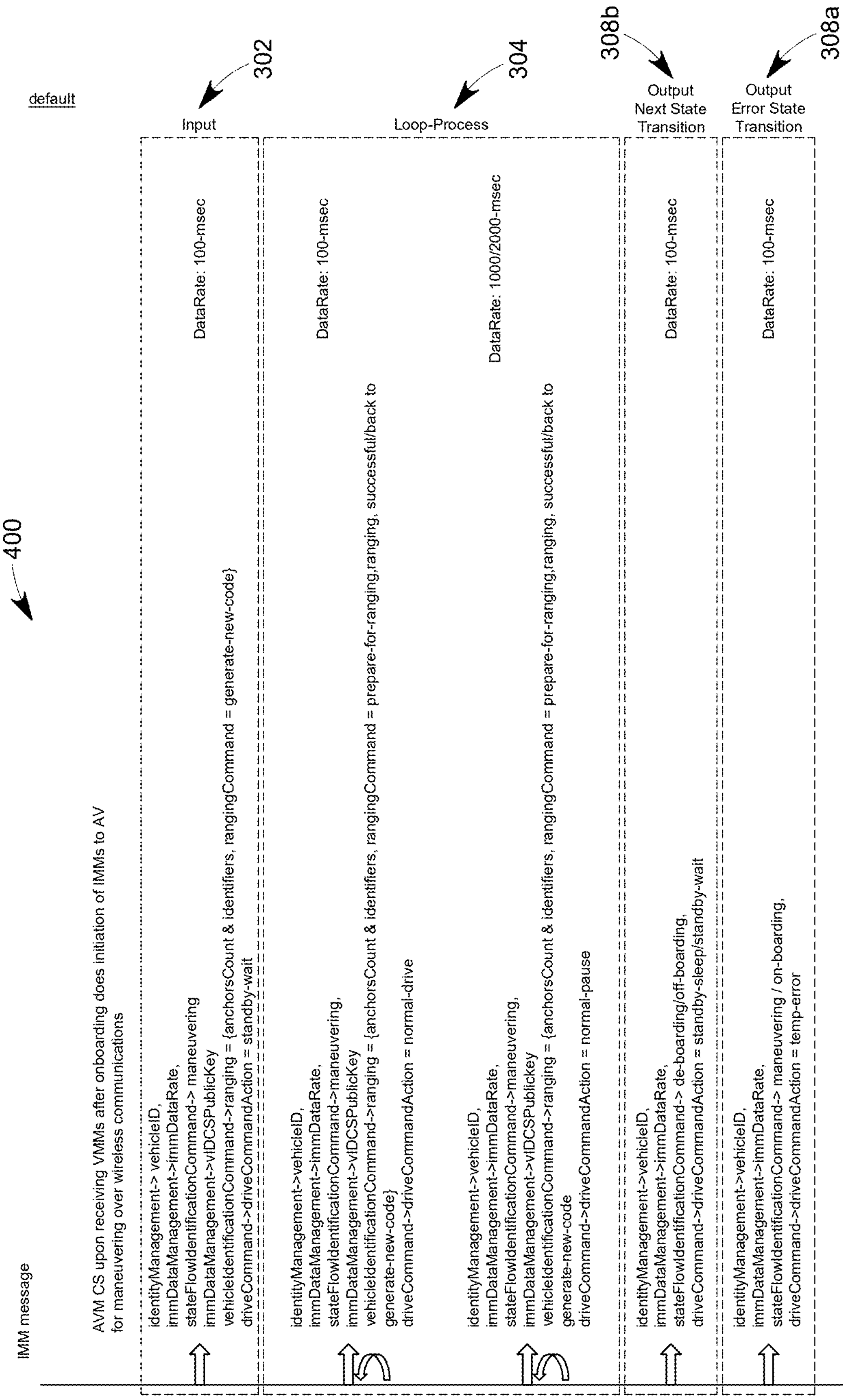
FIGS. 4A and 4B illustrate an exchange of messages between the automated vehicle and an infrastructure system in accordance with one or more embodiments of the present disclosure.
Figure 4B:
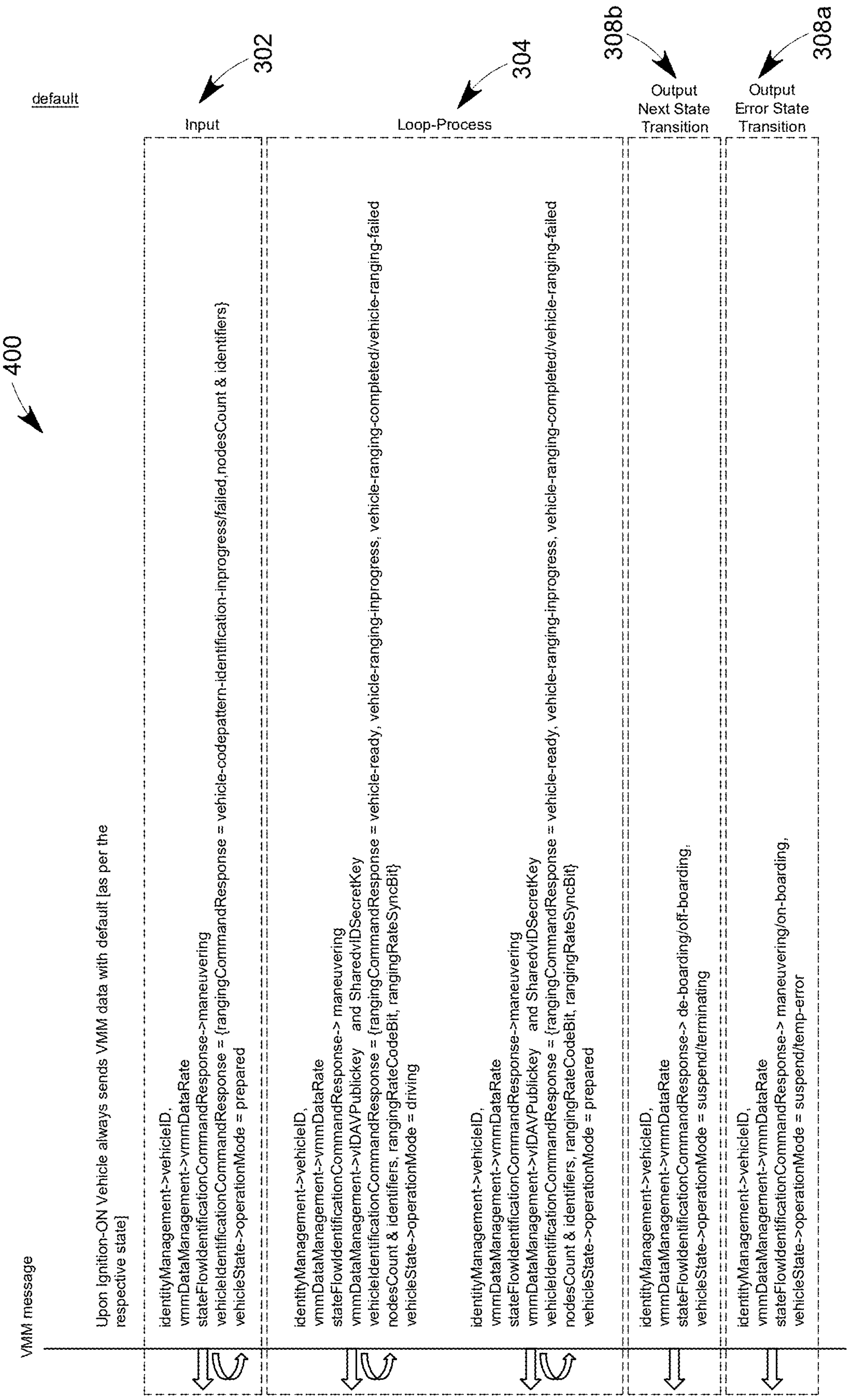

Referring to FIGS. 4A and 4B, an example exchange of the one or more VMMs and the one or more IMMs are displayed at 400. Example details of data elements associated with the one or more IMMs included as part of the maneuvering process 300 can comprise (e.g., as is shown in FIG. 4A), but are not limited to, the following:

- msgIssueRevision == “current-Version-Of-IMM message expected”
  - Note: VehicleContainerBlob is an array
- imm.VehicleContainerBlob.vehicleContainerChecksum == “checksum-value”
- imm.VehicleContainerBlob.vehicleContainerData.immDataManagement.immDataRate == “100-ms i.e. 10”
- imm.VehicleContainerBlob.vehicleContainerData.immDataManagement.rollingCounterFromIMMTransmitted == “RC value”
- imm.VehicleContainerBlob.vehicleContainerData.immDataManagement.rollingCounterOfVMMReceived == RC value”
- imm.VehicleContainerBlob.vehicleContainerData.immDataManagement.vehicleContainerGenerationTime.year == “current year”
- imm.VehicleContainerBlob.vehicleContainerData.immDataManagement.vehicleContainerGenerationTime.month == “current month”
- imm.VehicleContainerBlob.vehicleContainerData.immDataManagement.vehicleContainerGenerationTime.day == “current day”
- imm.VehicleContainerBlob.vehicleContainerData.immDataManagement.vehicleContainerGenerationTime.hour == “current hour”
- imm.VehicleContainerBlob.vehicleContainerData.immDataManagement.vehicleContainerGenerationTime.minute == “current minute”
- imm.VehicleContainerBlob.vehicleContainerData.immDataManagement.vehicleContainerGenerationTime.second == “current second and millisecond”
- imm.VehicleContainerBlob.vehicleContainerData.immDataManagement.vehicleContainerGenerationTimeConfidence == “TimeStamp Confidence from AVM CS”
- imm.VehicleContainerBlob.vehicleContainerData.identityManagement.vehicleID == “Vehicle-ID that matches with CMVS Vehicle-ID”
- imm.VehicleContainerBlob.vehicleContainerData.stateFlowIdentificationCommand == “3 i.e. maneuvering/automated”
- imm.VehicleContainerBlob.vehicleContainerData.drivingPermission.expirationTime.year == “expiration year”
- imm.VehicleContainerBlob.vehicleContainerData.drivingPermission.expirationTime.month == “expiration month”
- imm.VehicleContainerBlob.vehicleContainerData.drivingPermission.expirationTime.day == “expiration day”
- imm.VehicleContainerBlob.vehicleContainerData.drivingPermission.expirationTime.hour == “expiration hour”
- imm.VehicleContainerBlob.vehicleContainerData.drivingPermission.expirationTime.minute == “expiration minute”
- imm.VehicleContainerBlob.vehicleContainerData.drivingPermission.expirationTime.second == “expiration second and millisecond”
- imm.VehicleContainerBlob.vehicleContainerData.drivingPermission.expirationTimeConfidence == “Timestamp Confidence from AVM CS”
- imm.VehicleContainerBlob.vehicleContainerData.drivingPermission.velocityMax == “maximum velocity allowed for the vehicle at a given time interval”
- imm.VehicleContainerBlob.vehicleContainerData.drivingPermission.curvatureMin == “minimum curvature for the vehicle steering system at a given time interval”
- imm.VehicleContainerBlob.vehicleContainerData.drivingPermission.curvatureMax == “maximum curvature for the vehicle steering system at a given time interval”

-continued

- imm.VehicleContainerBlob.vehicleContainerData.driveCommand.driveCommand Action == "6 i.e. drive"
- imm.VehicleContainerBlob.vehicleContainerData.driveCommand.terminateReas on == "0/1/2/3/4" //Conditional-Mandatory
- imm.VehicleContainerBlob.vehicleContainerData.driveCommand.gearRequest == "0/1/2/3 i.e. neutral/park/forwardGears/reverseGears"
- imm.VehicleContainerBlob.vehicleContainerData.driveCommand.directionIndicat orRequest == "4 i.e. both"
- imm.VehicleContainerBlob.vehicleContainerData.driveCommand.parkingBrakeR equest == "0/1" //Conditional-Mandatory
- imm.VehicleContainerBlob.vehicleContainerData.driveCommand.emergencyStop Request == "0/1/2" //Conditional-Mandatory
- imm.VehicleContainerBlob.vehicleContainerData.driveCommand.processControl Request == "0/1/2/3" //Conditional-Mandatory
- imm.VehicleContainerBlob.vehicleContainerData.driveCommand.hornRequest == "0/1/2/3" //Conditional-Mandatory
- imm.VehicleContainerBlob.vehicleContainerData.driveCommand.brakeLights = "flashing" //Conditional-Mandatory
- imm.VehicleContainerBlob.vehicleContainerData.driveCommand.headLights = "solid-running-lights" //Conditional-Mandatory
- imm.VehicleContainerBlob.vehicleContainerData.controlInterface.trajectoryContr ol.controlTimeInterval == "2 means 20-msec or 5 means 50-msec"
- imm.VehicleContainerBlob.vehicleContainerData.controlInterface.trajectoryContr ol.timeReference.year == "current year for first element of the ControlTrajectory vector"
- imm.VehicleContainerBlob.vehicleContainerData.controlInterface.trajectoryContr ol.timeReference.month == "current month for first element of the ControlTrajectory vector"
- imm.VehicleContainerBlob.vehicleContainerData.controlInterface.trajectoryContr ol.timeReference.day == "current day for first element of the ControlTrajectory vector"
- imm.VehicleContainerBlob.vehicleContainerData.controlInterface.trajectoryContr ol.timeReference.hour == "current hour for first element of the ControlTrajectory vector"
- imm.VehicleContainerBlob.vehicleContainerData.controlInterface.trajectoryContr ol.timeReference.minute == "current minute for first element of the ControlTrajectory vector"
- imm.VehicleContainerBlob.vehicleContainerData.controlInterface.trajectoryContr ol.timeReference.second == "current second and millisecond for first element of the ControlTrajectory vector"
- imm.VehicleContainerBlob.vehicleContainerData.controlInterface.trajectoryContr ol.timeReferenceConfidence == "timestamp confidence of AVM CS"
- imm.VehicleContainerBlob.vehicleContainerData.controlInterface.trajectoryContr ol.distanceToStop == "value indicates the unsigned maximum distance that the vehicle can drive before a standstill in the control point"
- imm.VehicleContainerBlob.vehicleContainerData.controlInterface.trajectoryContr ol.controlTrajectory.curvature == "value indicates for vehicle to steer" // sequence of curvature control points
- imm.VehicleContainerBlob.vehicleContainerData.controlInterface.trajectoryContr ol.controlTrajectory.controlParameter.controlVelocity == "value indicates for vehicle to drive with target speed" // sequence of velocity control points
- imm.VehicleContainerBlob.vehicleContainerData.vehicleIdentificationCommand->ranging = {anchorsCount & identifiers, rangingCommand =prepare-for-ranging,ranging, successful/back to generate-new-code}

Example details of data elements associated with the one or more VMMs included as part of the maneuvering process 300 can comprise (e.g., as is shown in FIG. 4B), but are not limited to, the following:

- msgIssueRevision == "current version of VMM Message"
- vmmChecksum == "checksum-value"
- vmm.vmmDataManagement.vmmDataRate == "10 i.e. 100-msec"
- vmm.vmmDataManagement.rollingCounterFromVMMTransmitted == "RC value"
- vmm.vmmDataManagement.rollingCounterOfIMMReceived == "RC value"
- vmm.vmmDataManagement.vehicleMessageGenerationTime.year == "currentvmm year"
- vmm.vmmDataManagement.vehicleMessageGenerationTime.month == "current vmm month"
- vmm.vmmDataManagement.vehicleMessageGenerationTime.day == "current vmm day"
- vmm.vmmDataManagement.vehicleMessageGenerationTime.hour == "current vmm hour"

-continued

- vmm.vmmDataManagement.vehicleMessageGenerationTime.minute == "current vmm minute"
- vmm.vmmDataManagement.vehicleMessageGenerationTime.second == "current vmm second and millisecond"
- vmm.vmmDataManagement.vehicleMessageGenerationTimeConfidence == "timestamp confidence vmm"
- vmm.stateFlowIdentificationCommandResponse == "3 i.e. maneuvering/automated"
- vmm.identityManagement.vehicleID =="Vehicle-ID that matches with CMVS Vehicle-ID"
- vmm.vehicleControlInterfacePreference == "2 i.e. trajectory-control-velocity"
- vmm.vehicleState.vehicleStateGenerationTime.year == "current vehicle state year"
- vmm.vehicleState.vehicleStateGenerationTime.month == "current vehicle state month"
- vmm.vehicleState.vehicleStateGenerationTime.day == "current vehicle state day"
- vmm.vehicleState.vehicleStateGenerationTime.hour == "current vehicle state hour"
- vmm.vehicleState.vehicleStateGenerationTime.minute == "current vehicle state minute"
- vmm.vehicleState.vehicleStateGenerationTime.second == "current vehicle state second and millisecond"
- vmm.vehicleState.vehicleStateGenerationTimeConfidence == "timestamp confidence of vehicle state"
- vmm.vehicleState.operationMode == "6 i.e. drive"
- vmm.vehicleState.gearState == "0/1/2/3 i.e. neutral/park/forwardGears/reverseGears"
- vmm.vehicleState.directionIndicatorState == "4 i.e. both"
- vmm.vehicleState.currentVelocity == "current velocity of AV"
- vmm.vehicleState.currentCurvature == "current curvature of AV"
- vmm.vehicleState.secureStandstill == "0 i.e. secure standstill status of AV"
- vmm.vehicleIdentificationCommandResponse = {rangingCommandResponse = vehicle-ready, vehicle-ranging-inprogress ,vehicle-ranging-completed/vehicle-ranging-failed, nodesCount & identifiers, rangingRateCodeBit, rangingRateSyncBit}

It should be appreciated that any type, kind, format, number, etc. of data elements can be used, such as based on the particular operation or application. It should also be appreciated that the labels and/or names of the data elements are merely provided as examples.

Figure 5:
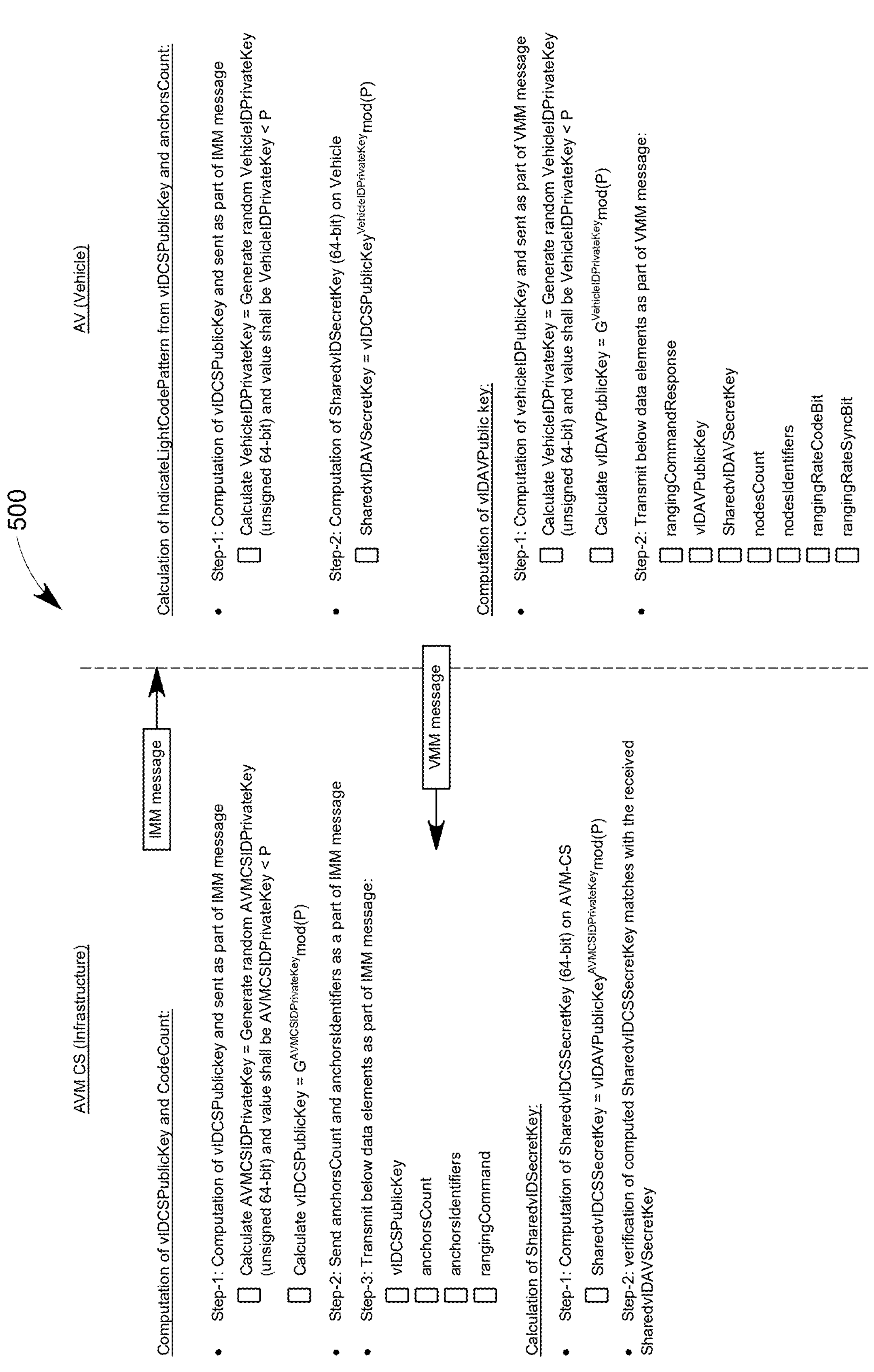
FIG. 5 illustrates a computation and calculation of a ranging code pattern using an exchange of messages in accordance with one or more embodiments of the present disclosure.

FIG. 5 is illustrative of a computation and calculation 500 of the ranging pattern as is described herein. For example, the computation of the infrastructure-initiated public security key includes the calculation of a private security key; the transmission (e.g., via the one or more IMMs) of data elements pertaining to anchorsCount and/or anchorsIdentifiers; and the transmission of data elements pertaining to VIDCSPublicKey, anchorsCount, anchorsIdentifiers, and/or rangingCommand. As another example, the calculation of a light code pattern based on the data elements pertaining to vIDCSPublicKey and/or anchorsCount includes the computation of vIDCSPublicKey and the computation of a SharedvIDSecret Key associated with the vehicle 102. As yet another example, the calculation of the SharedvIDSecretKey includes the computation of the SharedvIDCSecretKey and the verification of the computed SharedvIDCSSecretKey. As a further example, the computation of the vIDAVPublicKey includes the computation of the vehicleIDPublicKey and the transmission (e.g., via the one or more VMMs) of data elements pertaining to rangingCommandResponse, VIDAVPublicKey, SharedvIDAVSecretKey, nodesCount, nodesIdentifiers, rangingRateCodeBit, and/or rangingRateSyncBit. It is understood that during the computation and calculation of the ranging pattern, the infrastructure-side AVM algorithm 114 is configured to perform ranging of a location of the vehicle 102 using the one or more anchors 116 and the one or more nodes 118 based on the publicKey and SecretKey exchange.

Figure 6:
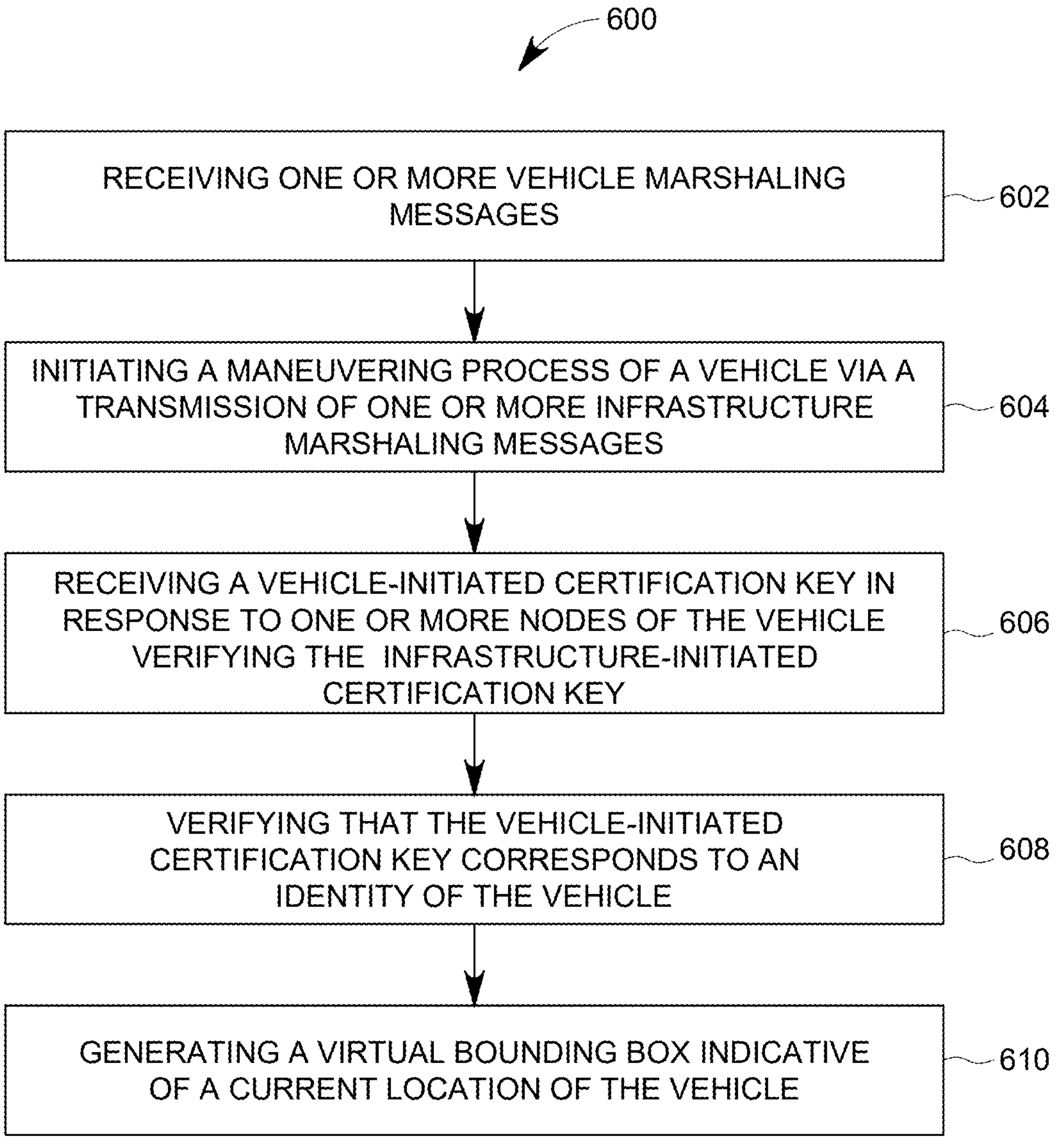
FIG. 6 is a flowchart illustrating an example method for onboarding the automated vehicle in accordance with one or more embodiments of the present disclosure.

FIG. 6 is a flowchart illustrating an example method 600 for maneuvering a vehicle (e.g., the vehicle 102). At operation 602, one or more vehicle marshaling messages (e.g., the one or more VMMs) are received. For example, the one or more VMMs are received in response to a broadcasted maneuvering command (e.g., the one or more IMMs). As another example, the maneuvering command is broadcasted by an infrastructure system (e.g., the infrastructure system 104). As a further example, the one or more VMMs are received from the vehicle located within a distance-related threshold from the infrastructure system. As yet another example, the distance-related threshold can be any pre-defined distance that is acceptable based on one or more technical capabilities of the infrastructure system and/or the vehicle. The one or more VMMs include at least a vehicle identification number (e.g., a VIN) associated with the vehicle, for example.

At operation 604, a maneuvering process of the vehicle is initiated. For example, the maneuvering process of the vehicle is initiated via a transmission of the one or more IMMs. As another example, the one or more IMMs are transmitted to one or more transmission points (e.g., the one or more anchors 116). As yet another example, the one or more IMMs comprise an infrastructure-initiated certification key (e.g., the infrastructure-initiated public security key) associated with the vehicle. As a further example, the infrastructure-initiated certification key includes a first time-stamp, the vehicle identification number, an original equipment manufacturer rolling identifier, or a combination thereof.

At operation 606, a vehicle-initiated certification key (e.g., the vehicle-initiated public security key) is received. For example, the vehicle-initiated certification key is received from the one or more transmission points. As another example, the vehicle-initiated certification key is received in response to one or more nodes (e.g., the one or more nodes 118) of the vehicle verifying the infrastructure-initiated certification key. As an additional example, the one or more VMMs comprise the vehicle-initiated certification key. As a further example, a data rate associated with the VMMs is higher than a data rate interval associated with the IMMs exchanged with the vehicle during the maneuvering process. For example, a transmission point of the one or more transmission points is configured to transmit the infrastructure-initiated certification key to the one or more nodes of the vehicle. As yet another example, the transmission point of the one or more transmission points is associated with a location of the vehicle. As a further example, the transmission point of the one or more transmission points is further configured to receive the vehicle-initiated certification key from the one or more nodes of the vehicle.

At operation 608, the vehicle-initiated certification key corresponding to an identity of the vehicle is verified. For example, the verification of the vehicle-initiated certification key includes performance of a stitching analysis of the vehicle-initiated certification key and/or the infrastructure-initiated certification key. As another example, the performance of the stitching analysis is based on a derived secret key approach analysis.

At operation 610, a virtual bounding box (e.g., the bounding box 120) indicative of a current location of the vehicle is generated. For example, the virtual bounding box is generated in response to verifying that the vehicle-initiated certification key corresponds to the identity of the vehicle. As another example, the generation of the virtual bounding box is based on a ranging code pattern generated from a secret key. As another example, the secret key is decoded using the vehicle-initiated certification key and/or the infrastructure-initiated certification key.

In one or more embodiments, a second infrastructure-initiated certification key is generated. For example, the second infrastructure-initiated certification key is generated based on a second time stamp, the vehicle identification number, the original equipment manufacturer rolling identifier, or a combination thereof. In one or more additional embodiments, a transmission point count message and/or a transmission point identification message is transmitted to the one or more transmission points.

In one or more further embodiments, the vehicle is caused to enter an offboarding state (e.g., a de-boarding state). For example, the vehicle is caused to enter the offboarding state based on successfully identifying the current location of the vehicle within a time-related threshold and/or using the virtual bounding box and/or determining that ranging during the maneuvering process is successful. Alternatively, the vehicle is caused to enter the offboarding state or an onboarding state based on one or more communication errors. For example, the one or more communication errors can include unsuccessfully identifying the current location of the vehicle within the time-related threshold, unsuccessfully decoding the verification of the vehicle-initiated certification key, and/or determining that the ranging during the maneuvering process is unsuccessful.

Figure 7:
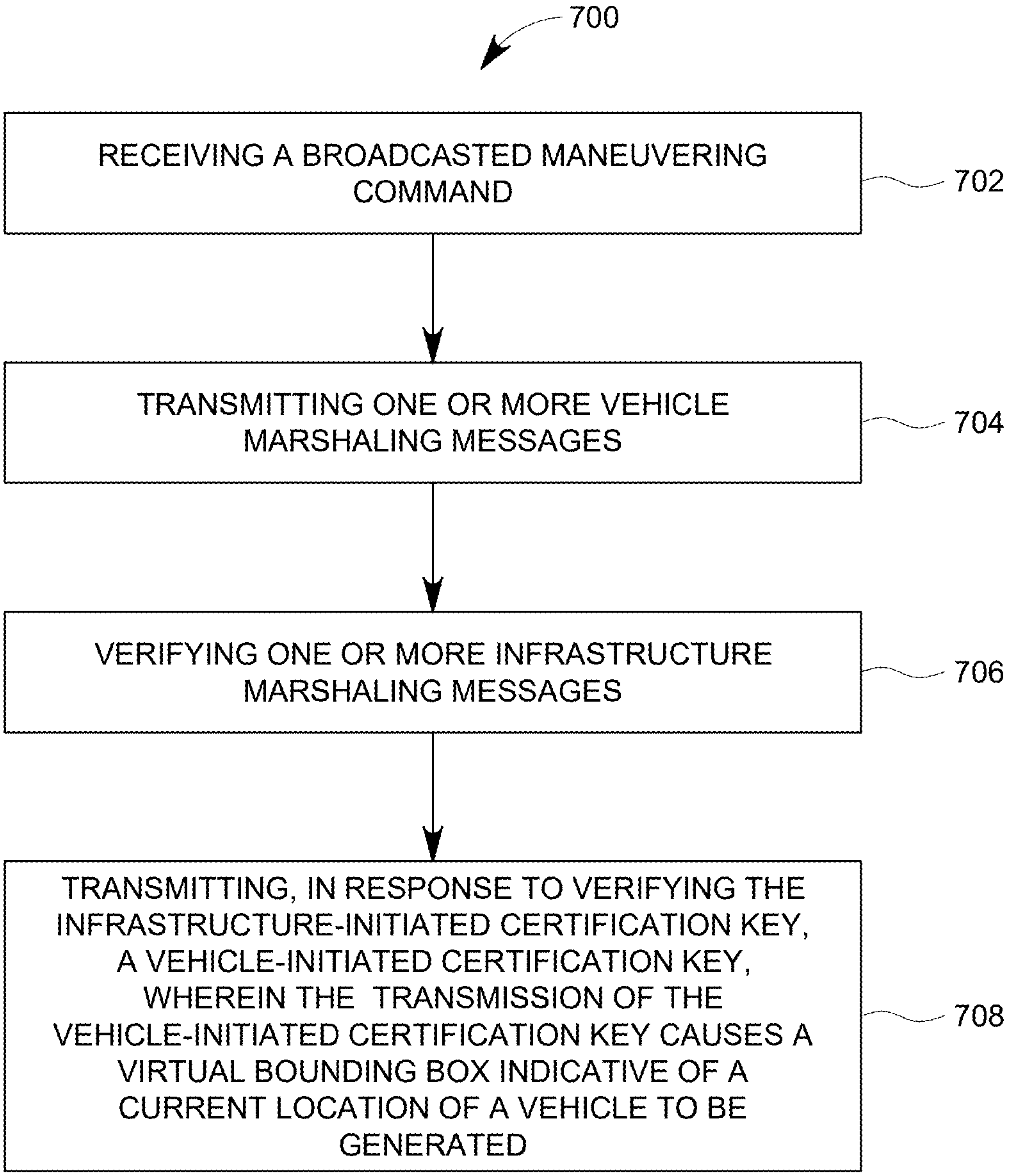
FIG. 7 is a flowchart illustrating another example method for onboarding the automated vehicle in accordance with one or more embodiments of the present disclosure.

FIG. 7 is a flowchart illustrating an example method 700 for maneuvering a vehicle (e.g., the vehicle 102). At operation 702, a broadcasted maneuvering command (e.g., the one or more IMMs) is received at the vehicle. For example, the broadcasted maneuvering command is received in response to the vehicle being located within a distance-related threshold from an infrastructure system (e.g., the infrastructure system 104). As another example, the distance-related threshold can be any predefined distance that is acceptable based one or more technical capabilities of the infrastructure system and/or the vehicle.

At operation 704, one or more vehicle marshaling messages (e.g., the one or more VMMs) are transmitted to the infrastructure system from the vehicle. For example, the one or more VMMs are transmitted based on receipt of the broadcasted maneuvering command. As another example, the one or more VMMs can include at least a vehicle identification number associated with the vehicle.

At operation 706, the one or more IMMs are verified. For example, the one or more IMMs comprise an infrastructure-initiated certification key (e.g., the infrastructure-initiated public security key) received from a transmission point of a plurality of transmission points (e.g., the one or more anchors 116). As an example, the transmission point of the plurality of transmission points is associated with a location of the vehicle. As another example, the verification of the of the infrastructure-initiated certification key includes performance of a stitching analysis of the vehicle-initiated certification key and/or the infrastructure-initiated certification key. As a further example, the performance of the stitching analysis is based on a derived secret key approach analysis.

At operation 708, a vehicle-initiated certification key (e.g., the vehicle-initiated public security key) is transmitted to the plurality of transmission points. For example, the vehicle-initiated certification key is transmitted in response to verifying the infrastructure-initiated certification key. As another example, the one or more VMMs comprise the vehicle-initiated certification key. As yet another example, a data rate associated with the VMMs is higher than a data rate interval associated with the IMMs exchanged with the vehicle during a maneuvering process. As a further example, the transmission of the vehicle-initiated certification key causes a virtual bounding box (e.g., the bounding box 120) to be generated by the infrastructure system. As an additional example, the virtual bounding box is indicative of a current location of the vehicle. As another example, the vehicle-initiated certification key can include a first timestamp, the vehicle identification number, an original equipment manufacturer rolling identifier, or a combination thereof. The generation of the virtual bounding box is based on a ranging code pattern generated from a secret key, for example. As another example, the secret key is decoded using the vehicle-initiated certification key and/or the infrastructure-initiated certification key.

In one or more embodiments, a second vehicle-initiated certification key is generated. For example, the second vehicle-initiated certification key is generated based on a second timestamp, the vehicle identification number, the original equipment manufacturer rolling identifier, or a combination thereof. In one or more further embodiments, a vehicular node count message, a vehicular identification message, one or more node identifiers, a ranging code bit, and/or a ranging rate sync bit is transmitted to the plurality of transmission points via one or more nodes (e.g., the one or more nodes 118) of the vehicle.

In one or more additional embodiments, an offboarding state (e.g., a de-boarding state) is entered based on the infrastructure system successfully identifying the current location of the vehicle within a time-related threshold and/or using the virtual bounding box and/or determining that ranging during the maneuvering process is successful. Alternatively, the offboarding state or an onboarding state is entered based on one or more communication errors. For example, the one or more communication errors can include the infrastructure system unsuccessfully identifying the current location of the vehicle within the time-related threshold, the infrastructure system unsuccessfully decoding the verification of the vehicle-initiated certification key, the infrastructure system determining that the ranging during the maneuvering process is unsuccessful, and/or the vehicle unsuccessfully decoding the verification of the infrastructure-initiated certification key.

Figure 8:
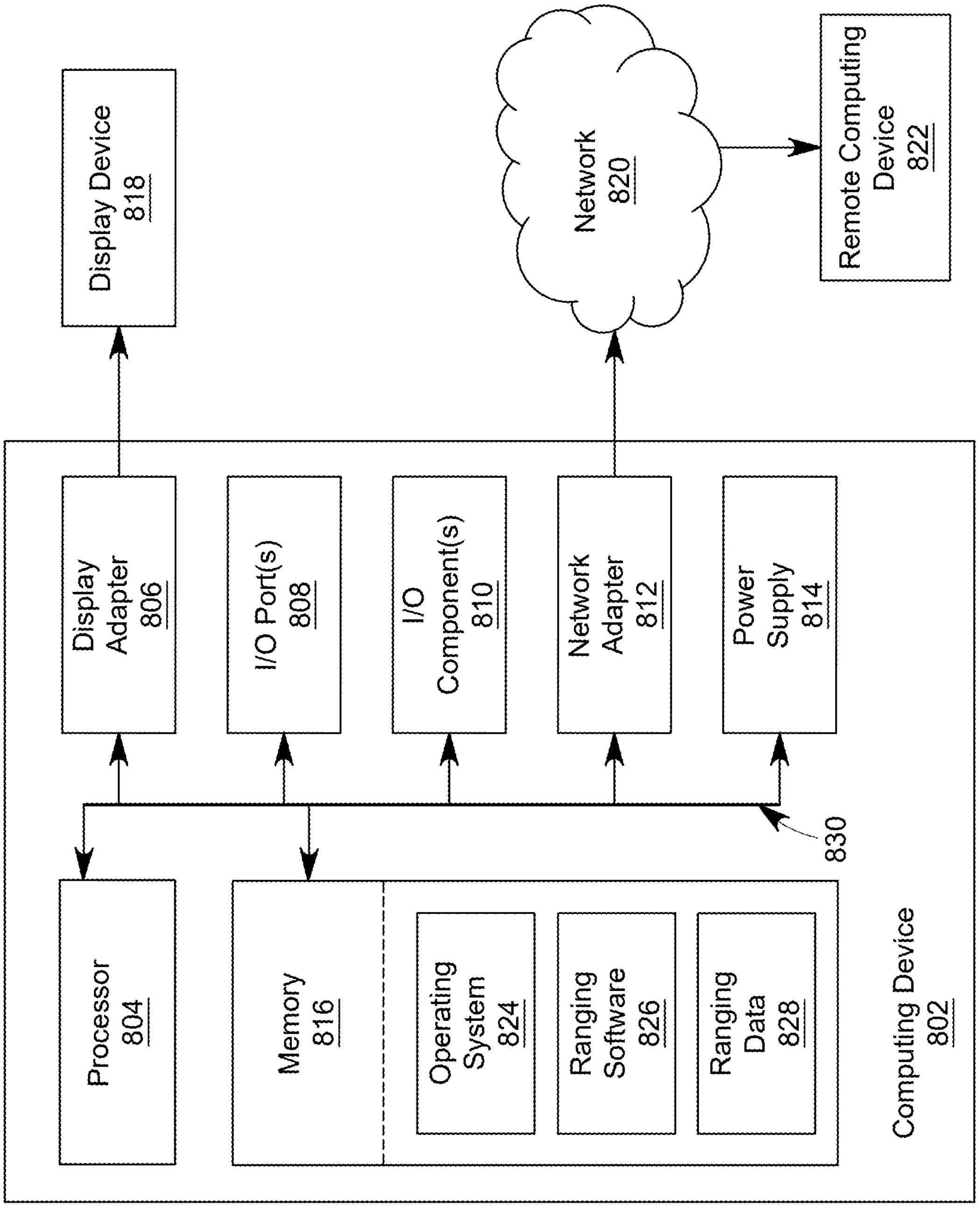
FIG. 8 is a block diagram illustrating an example computer system in accordance with one or more embodiments of the present disclosure.

FIG. 8 illustrates an operating environment that facilitates the performance of one or more systems and methods described herein. More specifically, the systems and methods described herein can be implemented using a computing device 802. For example, the computing device 802 can be a personal computer, a desktop, a laptop, a tablet, a hand-held computer, a server, a workstation, a mainframe, a wearable computer, a supercomputer, or a combination thereof. However, it is understood that the aforementioned examples of the computing device 802 is non-exhaustive and the computing device 802 can be any type of processing or computing device. The computing device 802 generally includes a processor 804, a display adapter 806, one or more input/output port(s) 808, one or more input/output component(s) 810, a network adapter 812, a power supply 814, and a memory 816. However, it is understood that the computing device 802 can include any additional components therein and is not required to include any of the listed components (e.g., the processor 804, the display adapter 806, the one or more input/output port(s) 808, the one or more input/output component(s) 810, the network adapter 812, the power supply 814, and the memory 816).

The processor 804 is configured to provide instructions to the computing device 802 so that the computing device 802 can process one or more tasks including the implementation of a software program to perform one or more operations as described in more detail herein. It is also understood that the computing device 802 may include any number or processors 804 therein. The display adapter 806 can be a graphics card or a video board that provides the computing device 802 with a capability to display content on a display device 818. For example, the display device 818 can be any screen, monitor, and/or light-emitting component associated with any of the personal computer, the desktop, the laptop, the tablet, the hand-held computer, the server, the workstation, the mainframe, the wearable computer, the supercomputer, or a combination thereof. However, it is understood that the aforementioned examples of the display device 818 is non-exhaustive and that the display device 818 can be any type of device capable of providing a visual display.

The input/output port(s) 808 provide a number of interfaces (e.g., sockets) for one or more cables to connect to the computing device 802. It is understood that there may be any number of input/output port(s) 808 on the computing device 802. For example, the input/output port(s) 808 provides a means for the computing device 802 to receive signals and/or data from an external device connected to the computing device 802 via the one or more cables. As another example, the input/output port(s) 808 provide a means for the computing device 802 to send signals and/or data to an external device connected to the computing device 802 via the one or more cables. The input/output component(s) 810 can include one or more components that support the input/output port(s) 808 such as, but not limited to, a switch, a push button, a pressure mat, a float switch, a keypad, a radio receive, or a combination thereof.

The network adapter 812 can be any type of network interface controller that is configured to provide a means for communicating over a network 820 with another computing device, such as a remote computing device 822. For example, the remote computing device 822 can be a user device such as a cellular-phone, a smartphone, a tablet, a laptop, or a combination thereof. The power supply 814 is configured to convert alternating high voltage current (e.g., AC) into direct current (e.g., DC) to provide power to the other components (e.g., the processor 804, the display adapter 806, the one or more input/output port(s) 808, the one or more input/output component(s) 810, the network adapter 812, and the memory 816) of the computing device 802.

Additionally, the memory 816 can be a mass storage device and/or a system memory such as a hard disk drive, a memory card, a solid-state drive, random access memory (RAM), or a combination thereof. The memory 816 is configured to provide storage for instructions and data associated with the operation of the computing device 802. The memory 816 can generally include an operating system 824, ranging software 826, and ranging data 828. For example, the operating system 824 is configured to manage and/or process any of the data and/or instructions associated with the ranging software 826 and/or ranging data 828, as described in more detail herein.

Furthermore, a system bus 830 is also included within the computing device 802 that is configured to couple each of the various components (e.g., the processor 804, the display adapter 806, the one or more input/output port(s) 808, the one or more input/output component(s) 810, the network adapter 812, the power supply 814, and the memory 816) of the computing device 802. It is also understood that each of the components of the computing device 802, and the functionality associated with each of the components of the computing device 802, may be implemented within the remote computing device 822. While the operating environment illustrated within FIG. 8 depicts a particular configuration associated with at least the computing device 802, the network 820, and the remote computing device 822, it is understood that the operating environment may be configured in any way.

Thus, one or more examples of the present disclosure provides a means for maneuvering a vehicle based on at least one wireless communication protocol that supports the exchange of infrastructure marshaling messages and vehicle marshaling messages between an automated vehicle and an infrastructure system, each of which implement machine learning-based analysis to such a communication exchange.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

transmitting a maneuvering command broadcasted by an infrastructure system to a vehicle in response to the vehicle being located within a distance-related threshold from the infrastructure system;

in response to the broadcasted maneuvering command, receiving one or more vehicle marshaling messages from the vehicle;

initiating a maneuvering process of the vehicle via a transmission of one or more infrastructure marshaling messages, to one or more transmission points positioned throughout a marshaling environment, wherein the one or more infrastructure marshaling messages comprise an infrastructure-initiated certification key associated with the vehicle;

receiving, from the one or more transmission points, a vehicle-initiated certification key in response to one or more nodes of the vehicle verifying the infrastructure-initiated certification key, wherein the one or more vehicle marshaling messages comprise the vehicle-initiated certification key, and wherein a data rate associated with the vehicle marshaling messages is higher than a data rate interval associated with the infrastructure marshaling messages exchanged with the vehicle during the maneuvering process;

verifying that the vehicle-initiated certification key corresponds to an identity of the vehicle;

in response to verifying that the vehicle-initiated certification key corresponds to the identity of the vehicle, generating, by the one or more transmission points, a virtual bounding box indicative of a current location of the vehicle; and autonomously guiding the vehicle toward a waypoint within the marshaling environment using the virtual bounding box.

2. The method of claim 1, wherein the one or more vehicle marshaling messages are received from the vehicle and includes at least a vehicle identification number associated with the vehicle.

3. The method of claim 2, wherein the infrastructure-initiated certification key includes a first timestamp, the vehicle identification number, an original equipment manufacturer rolling identifier, or a combination thereof.

4. The method of claim 2, further comprising:

generating a second infrastructure-initiated certification key based on a second timestamp, the vehicle identification number, an original equipment manufacturer rolling identifier, or a combination thereof.

5. The method of claim 1, further comprising:

transmitting, to the one or more transmission points, a transmission point count message, a transmission point identification message, or a combination thereof.

6. The method of claim 1, wherein a transmission point, of the one or more transmission points, associated with a location of the vehicle is configured to transmit the infrastructure-initiated certification key to the one or more nodes of the vehicle, and wherein the transmission point is further configured to receive the vehicle-initiated certification key from the one or more nodes of the vehicle.

7. The method of claim 1, further comprising:

causing the vehicle to enter an offboarding state based on successfully identifying the current location of the vehicle within a time-related threshold and using the virtual bounding box or determining that ranging during the maneuvering process is successful; or causing the vehicle to enter the offboarding state or an onboarding state based on one or more communication errors, wherein the one or more communication errors include:

unsuccessfully identifying the current location of the vehicle within the time-related threshold;

unsuccessfully decoding the verification of the vehicle-initiated certification key; or determining that the ranging during the maneuvering process is unsuccessful.

8. The method of claim 1, wherein the verification of the vehicle-initiated certification key further comprises:

performing a stitching analysis of the vehicle-initiated certification key and the infrastructure-initiated certification key based on a derived secret key approach analysis.

9. The method of claim 1, wherein the generation of the virtual bounding box is based on a ranging code pattern generated from a secret key, and wherein the secret key is decoded using the vehicle-initiated certification key and the infrastructure-initiated certification key.

10. A method comprising:

receiving, in response to being located within a distance-related threshold from an infrastructure system, a broadcasted maneuvering command at a vehicle;

in response to receipt of the broadcasted maneuvering command, transmitting one or more vehicle marshaling messages to the infrastructure system from the vehicle;

verifying one or more infrastructure marshaling messages, wherein the one or more infrastructure marshaling messages comprise an infrastructure-initiated certification key received from a transmission point of a plurality of transmission points positioned throughout a marshaling environment, wherein the transmission point is associated with a location of the vehicle;

transmitting, in response to verifying the infrastructure-initiated certification key, a vehicle-initiated certification key to the plurality of transmission points, wherein the one or more vehicle marshaling messages comprise the vehicle-initiated certification key, and wherein a data rate associated with the vehicle marshaling messages is higher than a data rate interval associated with the infrastructure marshaling messages exchanged with the vehicle during a maneuvering process, and wherein the transmission of the vehicle-initiated certification key causes a virtual bounding box indicative of a current location of the vehicle to be generated by the infrastructure system; and autonomously guiding the vehicle toward a waypoint within the marshaling environment using the virtual bounding box.

11. The method of claim 10, wherein the one or more vehicle marshaling messages include at least a vehicle identification number associated with the vehicle.

12. The method of claim 11, wherein the vehicle-initiated certification key includes a first timestamp, the vehicle identification number, an original equipment manufacturer rolling identifier, or a combination thereof.

13. The method of claim 11, further comprising:

generating a second vehicle-initiated certification key based on a second timestamp, the vehicle identification number, an original equipment manufacturer rolling identifier, or a combination thereof.

14. The method of claim 10, further comprising:

entering an offboarding state based on the infrastructure system successfully identifying the current location of the vehicle within a time-related threshold and using the virtual bounding box or determining that ranging during the maneuvering process is successful; or entering the offboarding state or an onboarding state based on one or more communication errors, wherein the one or more communication errors include:

the infrastructure system unsuccessfully identifying the current location of the vehicle within the time-related threshold;

the infrastructure system unsuccessfully decoding the verification of the vehicle-initiated certification key;

the infrastructure system determining that the ranging during the maneuvering process is unsuccessful; or the vehicle unsuccessfully decoding the verification of the infrastructure-initiated certification key.

15. The method of claim 10, further comprising:

transmitting, via one or more nodes of the vehicle, to the plurality of transmission points, a vehicular node count message, a vehicular identification message, one or more node identifiers, a ranging rate code bit, a ranging rate sync bit, or a combination thereof.

16. The method of claim 10, wherein the verification of the infrastructure-initiated certification key further comprises:

performing a stitching analysis of the vehicle-initiated certification key and the infrastructure-initiated certification key based on a derived secret key approach analysis.

17. The method of claim 10, wherein the generation of the virtual bounding box is based on a ranging code pattern generated from a secret key, and wherein the secret key is decoded using the vehicle-initiated certification key and the infrastructure-initiated certification key.

18. A system comprising:

an infrastructure system configured to:

broadcast a maneuvering command to a vehicle in response to the vehicle being located within a distance-related threshold from the infrastructure system;

in response to the broadcasted maneuvering command, receive one or more vehicle marshaling messages from the vehicle, initiate a maneuvering process of the vehicle via a transmission of one or more infrastructure marshaling messages to a plurality of transmission points positioned throughout a marshaling environment, wherein the one or more infrastructure marshaling messages comprise an infrastructure-initiated certification key associated with the vehicle, receive, from the one or more transmission points, a vehicle-initiated certification key, wherein the one or more vehicle marshaling messages comprise the vehicle-initiated certification key, and wherein a data rate associated with the vehicle marshaling messages is higher than a data rate interval associated with the infrastructure messages exchanged with the vehicle during the maneuvering process, verify that the vehicle-initiated certification key corresponds to an identity of the vehicle, generate, in response to verifying that the vehicle-initiated certification key corresponds to the identity of the vehicle, a virtual bounding box indicative of a current location of the vehicle, and autonomously guide the vehicle toward a waypoint within the marshaling environment using the virtual bounding box; and the vehicle configured to:

receive, in response to being located within the distance-related threshold from the infrastructure system, the broadcasted maneuvering command, transmit, based on receipt of the broadcasted maneuvering command, the one or more vehicle marshaling messages to the infrastructure system, verify the infrastructure-initiated certification key received from a transmission point of the plurality of transmission points, wherein the transmission point is associated with the location of the vehicle, and transmit, in response to verifying the infrastructure-initiated certification key, the vehicle-initiated certification key to the plurality of transmission points.

19. The system of claim 18, wherein the generation of the virtual bounding box is based on a ranging code pattern generated from a secret key, and wherein the secret key is decoded using the vehicle-initiated certification key and the infrastructure-initiated certification key.

20. The system of claim 18, wherein the vehicle configured to verify the vehicle-initiated certification key is further configured to:

perform a stitching analysis of the vehicle-initiated certification key and the infrastructure-initiated certification key based on a derived secret key approach analysis.

* * * * *